US012516951B2

(12) United States Patent
Nakano et al.

(10) Patent No.: US 12,516,951 B2
(45) Date of Patent: Jan. 6, 2026

(54) IMAGE GENERATION APPARATUS, DISPLAY SYSTEM, IMAGE GENERATION METHOD, AND RECORDING MEDIUM

(71) Applicant: Panasonic Automotive Systems Co., Ltd., Kanagawa (JP)

(72) Inventors: Nobuyuki Nakano, Osaka (JP); Toshiya Mori, Osaka (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 0 days.

(21) Appl. No.: 18/887,754

(22) Filed: Sep. 17, 2024

(65) Prior Publication Data

US 2025/0012590 A1 Jan. 9, 2025

Related U.S. Application Data

(63) Continuation of application No. PCT/JP2023/005001, filed on Feb. 14, 2023.

(30) Foreign Application Priority Data

Mar. 31, 2022 (JP) ................................ 2022-058288

(51) Int. Cl.
*G01C 21/36* (2006.01)
*B60K 35/00* (2024.01)
(Continued)

(52) U.S. Cl.
CPC ............ *G01C 21/365* (2013.01); *B60K 35/22* (2024.01); *B60K 35/232* (2024.01); *B60K 35/50* (2024.01);
(Continued)

(58) Field of Classification Search
CPC .. G01C 21/365; G01C 21/3632; G01C 21/34; G06T 11/001; B60K 35/23; B60K 35/28;
(Continued)

(56) References Cited

U.S. PATENT DOCUMENTS 6,360,168 B1 * 3/2002 Shimabara ......... G01C 21/3638 701/436
2016/0327402 A1 11/2016 Funabiki et al.
(Continued)

FOREIGN PATENT DOCUMENTS

JP 2017-194556 10/2017
WO 2015/118859 8/2015
(Continued)

OTHER PUBLICATIONS

International Search Report issued in International Pat. Appl. No. PCT/JP2023/005001, dated May 9, 2023, along with an English translation thereof.

(Continued)

*Primary Examiner* — Douglas Wilson
(74) *Attorney, Agent, or Firm* — GREENBLUM & BERNSTEIN, P.L.C.

(57) ABSTRACT

An image generation apparatus (vehicle information acquirer/controller) is utilized in a display system that projects an image onto a display medium of a vehicle to enable a user to visually recognize a virtual image, and includes a vehicle information acquirer that acquires vehicle position information indicating the current location of a vehicle and path information indicating a path along which the vehicle is guided to a destination; a map image generator that generates a map image of the vicinity of the current location in accordance with the vehicle position information; a guide image generator that generates a guide image indicating a path relative to the current location in accordance with the vehicle position information and the path information; and a composite image generator that generates a composite image for projecting the guide image and the map image, in a mode in which these images are associated with each other.

17 Claims, 11 Drawing Sheets

2a
d1
10
2b

(51) Int. Cl.

| | |
|---|---|
| ***B60K 35/22*** | (2024.01) |
| ***B60K 35/23*** | (2024.01) |
| ***B60K 35/232*** | (2024.01) |
| ***B60K 35/28*** | (2024.01) |
| ***B60K 35/50*** | (2024.01) |
| ***B60K 35/60*** | (2024.01) |
| ***B60K 35/70*** | (2024.01) |
| ***B60K 35/90*** | (2024.01) |
| ***B60K 37/00*** | (2024.01) |
| ***G01C 21/34*** | (2006.01) |
| ***G06T 11/00*** | (2006.01) |

(52) U.S. Cl.

CPC .............. *B60K 35/60* (2024.01); *B60K 35/70* (2024.01); *B60K 35/90* (2024.01); *B60K 37/00* (2013.01); *G01C 21/3632* (2013.01); *G06T 11/001* (2013.01); *B60K 35/00* (2013.01); *B60K 35/23* (2024.01); *B60K 35/28* (2024.01); *B60K 2360/166* (2024.01); *G01C 21/34* (2013.01)

(58) Field of Classification Search

CPC .............. B60K 2360/166; B60K 35/00; B60K 35/232; B60K 35/50; B60K 35/60; B60K 35/70; B60K 35/90; B60K 37/00; B60K 35/22

See application file for complete search history.

(56) References Cited

U.S. PATENT DOCUMENTS

| | | | | |
|---|---|---|---|---|
| 2020/0269759 | A1* | 8/2020 | Watanabe | .......... G01C 21/3638 |
| 2021/0372810 | A1 | 12/2021 | Hato et al. | |

FOREIGN PATENT DOCUMENTS

| | | | | |
|---|---|---|---|---|
| WO | WO-2019097762 A1 * | 5/2019 | ........... B60K 35/234 |
| WO | 2020/166252 | 8/2020 | |

OTHER PUBLICATIONS

Jul. 15, 2025 Japanese Office Action issued in the corresponding Japanese patent application No. 2022-058288 with English translation thereof.

* cited by examiner 10
(a)
ψ
Yawing axis
10
θ
Pitch axis
Roll axis
φ
(b)
2
Travelling direction
10
z
y
(c)

IMAGE GENERATION APPARATUS, DISPLAY SYSTEM, IMAGE GENERATION METHOD, AND RECORDING MEDIUM

CROSS REFERENCE TO RELATED APPLICATIONS

This is a continuation application of PCT International Application No. PCT/JP2023/005001 filed on Feb. 14, 2023, designating the United States of America, which is based on and claims priority of Japanese Patent Application No. 2022-058288 filed on Mar. 31, 2022.

FIELD

The present disclosure relates to a display system for enabling a user to visually recognize an image as a virtual image, and to an image generation apparatus, an image generation method, and a recording medium that are utilized in the display system.

BACKGROUND

Display systems have conventionally been proposed in which light representing an image is projected onto and reflected off a plate-like translucent display medium (projection) while showing a background to a user through the display medium so as to enable the user to visually recognize the image as a virtual image. Such display systems use so-called augmented reality (AR) and are capable of displaying, in a real background, an image related to the background. In particular, in fields such as automobile-related fields, so-called head-up displays (HUDs) have been developed that display images indicating speed or various types of warnings as virtual images in front of a windshield during driving (see, for example, Patent Literature (PTL) 1).

The use of such a display device enables a driver who is the user to see driving-related images, i.e., display objects (e.g., a map, a speed meter, or a navigation direction), without large eye movements while seeing the outside world ahead. The driver is thus able to drive more safely.

CITATION LIST

Patent Literature

PTL 1: International Publication No. 2015/118859

SUMMARY

This technique, however, has a problem that the user is likely to feel discomfort on such display objects.

In view of this, the present disclosure provides a display system that alleviates user discomfort on display objects, and an image generation apparatus, an image generation method, and a recording medium that are utilized in the display system An image generation apparatus according to one aspect of the present disclosure is an image generation apparatus for use in a display system that projects an image onto a display medium of a vehicle to enable a user to visually recognize a virtual image of the image. The image generation apparatus includes a vehicle information acquirer that acquires vehicle position information and path information, the vehicle position information indicating a current location of the vehicle, the path information indicating a path along which the vehicle is guided to a destination, a map image generator that generates a map image of a vicinity of the current location in accordance with the vehicle position information acquired, a guide image generator that generates a guide image that indicates the path relative to the current location in accordance with the vehicle position information acquired and the path information acquired, and an image composition unit that generates a composite image for projecting the guide image and the map image which have been generated, in a mode in which the guide image and the map image are associated with each other.

A display system according to one aspect of the present disclosure includes the image generation apparatus described above, a display that displays the composite image, and a projector that projects light onto the display medium, the light representing the composite image displayed on the display.

An image generation method according to one aspect of the present disclosure is an image generation method to be executed by a computer for projecting an image onto a display medium of a vehicle to enable a user to visually recognize a virtual image of the image. The image generation method includes acquiring vehicle position information and path information, the vehicle position information indicating a current location of the vehicle, the path information indicating a path along which the vehicle is guided to a destination, generating a map image of a vicinity of the current location in accordance with the vehicle position information acquired, generating a guide image that indicates the path relative to the current location, in accordance with the vehicle position information acquired and the path information acquired, and generating a composite image for projecting the guide image and the map image which have been generated, in a mode in which the guide image and the map image are associated with each other.

Note that these general and specific aspects may be achieved by a system, a method, an integrated circuit, a computer program, or a computer-readable recording medium such as a CD-ROM, or may be achieved by any combination of a system, a method, an integrated circuit, a computer program, and a computer-readable recording medium. The recording medium as referred to herein may be a non-transitory recording medium.

The image generation apparatus and so on according to the present disclosure is capable of alleviating user discomfort on display objects.

Further advantages and effects of one aspect of the present disclosure become apparent from the specification and the drawings. These advantages and/or effects are each implemented by features described in some embodiments and in the specification and drawings, but not all of them have to be implemented necessarily in order to achieve one or more of the same features.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENT

Figure 1:
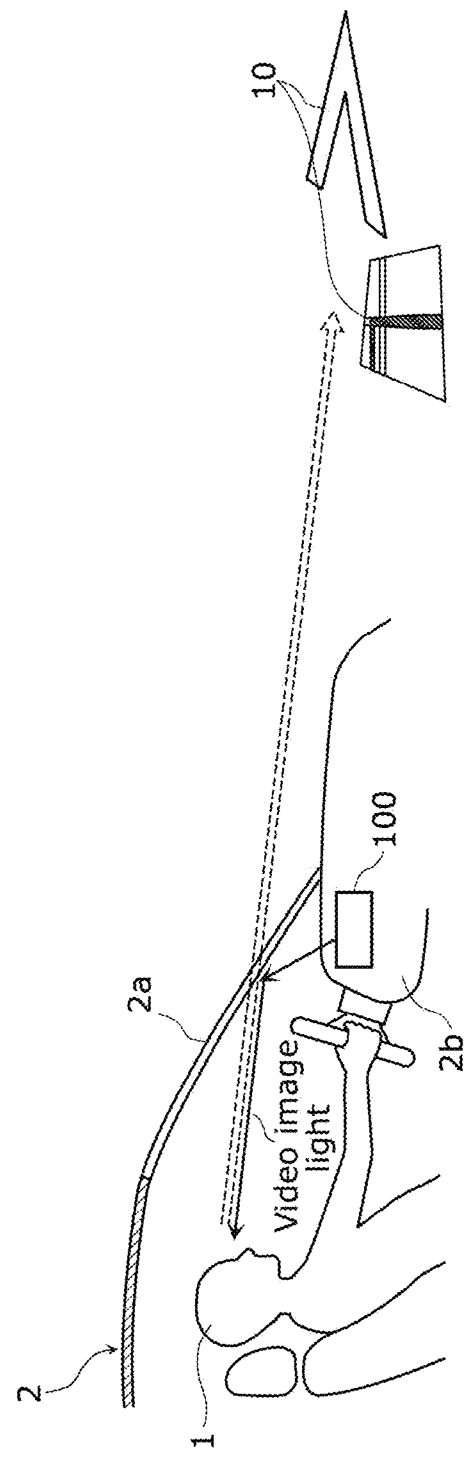
FIG. 1 is a diagram showing an example of use of a display device according to an embodiment.

Underlying Knowledge Forming Basis of the Present Disclosure

The inventors of the present disclosure have found the following possible problems with the display device according to PTL 1 described in the "Background".

The display device according to PTL 1 displays guidance for navigating a vehicle. That is, the display device overlays a display object such as an arrow on a road surface. The display of such guidance is expressed as AR, and the display object in the display of guidance may, for example, be of a long carpet-like shape.

The display object in the display of guidance may, however, extend off a driving lane or fail to indicate a proper path when a low-precision map or a sensor with low detection accuracy is used for navigation. In other words, overlay misregistration may occur. Thus, some attempts such as displaying map information in addition to the aforementioned display of guidance has conventionally been made to provide the user with more accurate information. However, the user who visually recognizes such a good deal of information at a stroke will face a complexity of selecting or deselecting information necessary for the user and further constructing, by the user himself or herself, complex information that is interpreted overall from a plurality of pieces of information. This complexity may give a feeling of discomfort to the user, and this feeling of discomfort may enable the user to mislead the vehicle.

To solve the problems described above, an image generation apparatus according to a first aspect of the present disclosure is an image generation apparatus for use in a display system that projects an image onto a display medium of a vehicle to enable a user to visually recognize a virtual image of the image. The image generation apparatus includes a vehicle information acquirer that acquires vehicle position information and path information, the vehicle position information indicating a current location of the vehicle, the path information indicating a path along which the vehicle is guided to a destination, a map image generator that generates a map image of a vicinity of the current location in accordance with the vehicle position information acquired, a guide image generator that generates a guide image that indicates the path relative to the current location in accordance with the vehicle position information acquired and the path information acquired, and an image composition unit that generates a composite image for projecting the guide image and the map image which have been generated, in a mode in which the guide image and the map image are associated with each other.

Accordingly, the guide image and the map image which have been generated can be projected in a mode in which the guide image and the map image are associated with each other. Since the user is able to naturally interpret the association between the guide image and the map image, it is possible to alleviate user discomfort even if the guide image and the map image are displayed together.

For example, an image generation apparatus according to a second aspect is the image generation apparatus according to the first aspect, in which the map image generator generates the map image that is visually recognized by the user along a road surface ahead of the vehicle.

This naturally appeals to the user for the necessity of interpreting the map image as information associated with the road surface. Accordingly, it is possible to further alleviate user discomfort.

For example, an image generation apparatus according to a third aspect is the image generation apparatus according to the first or second aspect and further includes an auxiliary image generator that generates an auxiliary image that associates the guide image with the map image. In the composite image, the guide image and the map image are associated with each other by the auxiliary image overlaid on the map image.

The auxiliary image enables the user to naturally interpret the association between the guide image and the map image.

For example, an image generation apparatus according to a fourth aspect is the image generation apparatus according to the third aspect and further includes a display position setter that sets a display position of the guide image to enable the user to visually recognize a virtual image of the guide image in a position that overlaps a path point on the path. The auxiliary image is overlaid on the position on the map image that corresponds to the path point at which the virtual image of the guide image is displayed.

The association of the display position of the guide image with the auxiliary image overlaid in a corresponding position on the map image enables the user to naturally interpret the association between the guide image and the map image.

For example, an image generation apparatus according to a fifth aspect is the image generation apparatus according to the third aspect, in which the auxiliary image generator generates the auxiliary image that is visually recognized by the user in a shape corresponding to a shape of the guide image.

Since the guide image and the auxiliary image are of the same shape, the user is able to naturally interpret the association of the auxiliary image with the guide image and the map image.

For example, an image generation apparatus according to a sixth aspect is the image generation apparatus according to the fifth aspect, in which the auxiliary image is overlaid on a position on the map image that corresponds to the current location.

This enables the user to naturally interpret the auxiliary image that indicates the position on the map image that corresponds to the current location.

For example, an image generation apparatus according to a seventh aspect is the image generation apparatus according to the third aspect and further includes a display position setter that sets a display position of the guide image to enable the user to visually recognize a virtual image of the guide image in a position that overlaps a path point on the path. The auxiliary image generator generates a first auxiliary image and a second auxiliary image as two auxiliary images each being the auxiliary image, the first auxiliary image is overlaid on a position on the map image that corresponds to the path point at which the virtual image of the guide image is displayed, and the second auxiliary image is overlaid on a position on the map image that corresponds to the current location.

This further improves the effect of enabling the user to naturally interpret the association between the guide image and the map image by using the auxiliary image including the first auxiliary image and the second auxiliary image from a plurality of points of view.

For example, an image generation apparatus according to an eighth aspect is the image generation apparatus according to the seventh aspect, in which the auxiliary image generator generates the first auxiliary image that is visually recognized by the user in a shape corresponding to a shape of the guide image.

Since the guide image and the first auxiliary image are of the same shape, the user is able to naturally interpret the association of the first auxiliary image with the guide image and the map image.

For example, an image generation apparatus according to a ninth aspect is the image generation apparatus according to any one of the first to eighth aspects, in which the guide image generator determines at least one of an attitude or a shape of a virtual image of the guide image that is visually recognized by the user, in accordance with the path information, and the guide image generator generates the guide image that is visually recognized by the user in at least one of the attitude or the shape determined.

This enables the user to visually recognize the guide image by at least one of the attitude or the shape that is determined based on the path information.

For example, an image generation apparatus according to a tenth aspect is the image generation apparatus according to any one of the first to ninth aspects, in which the map image generator generates the map image to make an upward direction in the map image correspond to a travelling direction of the vehicle.

This brings about the advantage of enabling the user to easily understand that the vehicle is travelling upward in the map image.

For example, an image generation apparatus according to an eleventh aspect is the image generation apparatus according to any one of the first to ninth aspects, in which the map image generator generates the map image to make a central portion of the map image correspond to the current location.

This enables the user to associate the map image with information that is obtained visually as a landscape viewed from the vehicle, while acquiring additional information such as the presence of any mark in the vicinity of the vehicle in a range centered on the current location of the vehicle.

For example, an image generation apparatus according to a twelfth aspect is the image generation apparatus according to any one of the first to ninth aspects, in which the map image generator generates the map image to make a central portion of the map image correspond to a first position on the path, and when the vehicle has passed through the first position, the map image generator generates the map image to make the central portion correspond to a second position on the path, the second position being closer to the destination than the first position is.

Accordingly, the map image is generated so as to guide the vehicle closer to the destination while sequentially passing a plurality of positions located on the path (e.g., a point of a right or left turn or a store located on the way).

For example, an image generation apparatus according to a thirteenth aspect is the image generation apparatus according to the first or second aspect, in which the guide image generator changes a mode of the guide image that is visually recognized by the user, according to a distance from the current location of the vehicle to a point of a right or left turn on the path, and the map image generator generates the map image that is visually recognized by the user, in a mode associated with a change in the mode of the guide image.

This enables the user to naturally interpret the association between the guide image and the map image from the guide image displayed in the mode that changes according to the distance from the current location of the vehicle to a given point of a right or left turn along the path and from the map image displayed in the mode associated with that change.

For example, an image generation apparatus according to a fourteenth aspect is the image generation apparatus according to the thirteenth aspect, in which the guide image generator changes a color of the guide image that is visually recognized by the user, according to a distance from the current location of the vehicle to a point of a right or left turn on the path.

This enables the user to naturally interpret the association between the guide image and the map image from the guide image that is displayed in the mode in which coloring changes according to the distance from the current location of the vehicle to a given point of a right or left turn.

For example, an image generation apparatus according to a fifteenth aspect is the image generation apparatus according to the fourteenth aspect, in which the map image generator changes coloring of a section of the map image according to a distance to the point of the right or left turn on the path, the section ranging from the current location of the vehicle to the point of the right or left turn, and the guide image generator changes the color of the guide image to a color that corresponds to coloring in a position on the map image that corresponds to the current location of the vehicle.

This enables the user to naturally interpret the association between the guide image and the map image from the map image and the guide image, the map image being displayed in the mode in which the color of the section of the map image from the current location of the vehicle to a given point of a right or left turn on the path changes according to the distance to the point of the right or left turn, the guide image being displayed in the mode in which coloring changes according to coloring in a corresponding position on the map image.

A display system according to a sixteenth aspect of the present disclosure includes the image generation apparatus described above, a display that displays the composite image, and a projector that projects light onto the display medium, the light representing the composite image displayed on the display.

Accordingly, it is possible to achieve the display system capable of achieving the effects of the image generation apparatus described above.

An image generation method according to a seventeenth aspect of the present disclosure is an image generation method to be executed by a computer for projecting an image onto a display medium of a vehicle to enable a user to visually recognize a virtual image of the image. The image generation method includes acquiring vehicle position information and path information, the vehicle position information indicating a current location of the vehicle, the path information indicating a path along which the vehicle is guided to a destination, generating a map image of a vicinity of the current location in accordance with the vehicle position information acquired, generating a guide image that indicates the path relative to the current location, in accordance with the vehicle position information acquired and the path information acquired, and generating a composite image for projecting the guide image and the map image which have been generated, in a mode in which the guide image and the map image are associated with each other.

Accordingly, it is possible to achieve effects similar to those of the image generation apparatus described above.

A recording medium according to an eighteenth aspect of the present disclosure is a non-transitory computer-readable recording medium having recorded thereon a program for causing a computer to execute the image generation method described above.

Accordingly, it is possible to achieve effects similar to those of the image generation method described above by using the computer.

Note that these general and specific aspects may be achieved by a system, a method, an integrated circuit, a computer program, or a computer-readable recording medium such as a CD-ROM, or may be achieved by any combination of a system, a method, an integrated circuit, a computer program, and a computer-readable recording medium. The recording medium as referred to herein may be a non-transitory recording medium.

An embodiment will be described hereinafter in greater detail with reference to the accompanying drawings.

Note that the embodiment described below shows a general or specific example. Numerical values, shapes, materials, constituent elements, positions in the layout of constituent elements and connection forms of the constituent elements, steps, a sequence of steps, and so on shown in the following embodiment are mere examples and do not intend to limit the scope of the present disclosure. Among constituent elements in the following exemplary embodiment, those that are not recited in any independent claim are described as optional constituent elements.

Each drawing is a schematic diagram and does not necessarily provide precise depiction. Substantially the same constituent elements are given the same reference signs throughout the drawings.

Embodiment

[Overall Configuration]

FIG. 1 is a diagram showing an example of use of a display system according to an embodiment of the present disclosure.

Display system 100 according to the present embodiment is configured as a head-up display (HUD) and mounted on vehicle 2. As one specific example, display system 100 is built in dashboard 2*b* of vehicle 2.

Display system 100 projects video image light that represents display object 10 onto windshield 2*a* of vehicle 2. As a result, the video image light is reflected off windshield 2*a* and directed toward, for example, user 1 who is the driver of vehicle 2. This enables user 1 to visually recognize display object 10 as a virtual image through windshield 2*a*. That is, display system 100 enables user 1 to visually recognize display object 10 as a virtual image. Note that causing user 1 to visually recognize display object 10 as a virtual image is also referred to displaying display object 10, and the operation of projecting the video image light means the same as the operation of displaying display object 10. Windshield 2*a* is one example of a display medium. In the present embodiment, windshield 2*a* is used as the display medium, but in the case where vehicle 2 includes a combiner, display system 100 may project the video image light onto the combiner that serves as the display medium.

Windshield 2*a* is a plate-like translucent display medium. Thus, display system 100 shows a background such as a road surface to user 1 through windshield 2*a* when causing user 1 to visually recognize display object 10 as a virtual image. That is, AR allows display object 10 to be displayed in the actual background.

Display object 10 is an image of a shape that indicates one direction, and specific examples thereof include an image of a three-dimensional shape such as an arrow head and an image of a planar map that is shaped along a travelling surface (road surface) in the travelling direction of vehicle 2. Note that the one direction corresponds to the direction of the tip end of the arrow head and is hereinafter also referred to as the pointed direction. The pointed direction of display object 10 is in a direction in which vehicle 2 is guided to a destination, i.e., a navigation direction.

Accordingly, the use of display system 100 enables user 1 as the driver to see display object 10 without large eye movements while seeing the outside world ahead. Thus, the user is able to drive more safely while grasping the map and the navigation direction.

Figure 2:
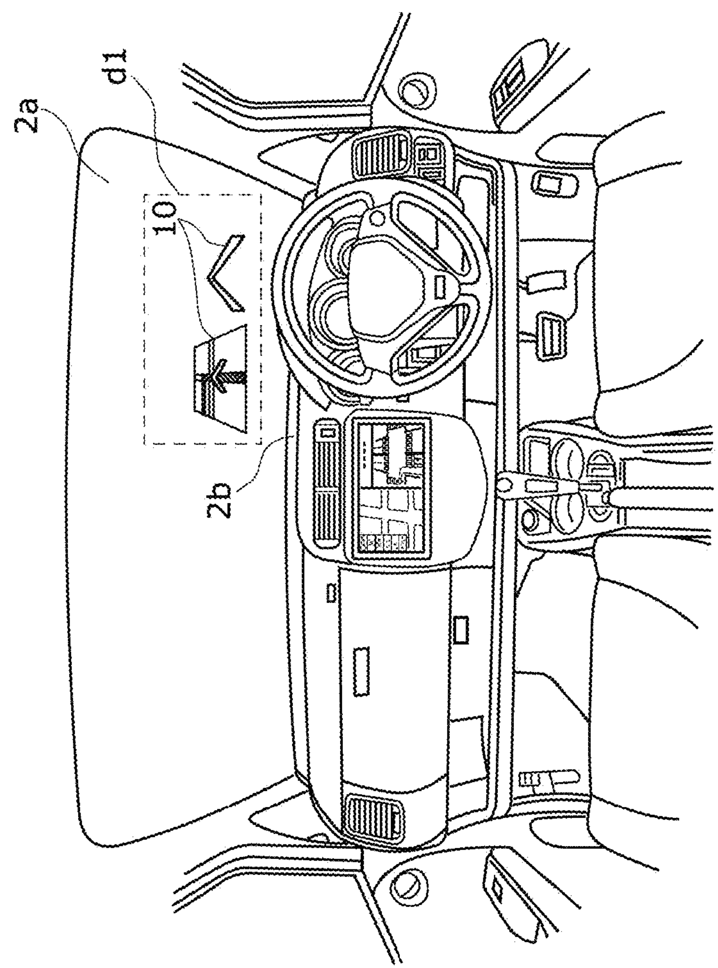
FIG. 2 is a diagram showing one example of the interior of a vehicle that includes the display device according to the embodiment.

FIG. 2 is a diagram showing one example of the interior of vehicle 2 equipped with display system 100 according to the present embodiment.

Display system 100, which is concealed in dashboard 2*b*, projects video image light onto windshield 2*a*. For example, the projection of the video image light from display system 100 causes display object 10 to appear as a virtual image within display range d1 of windshield 2*a*.

Figure 3:
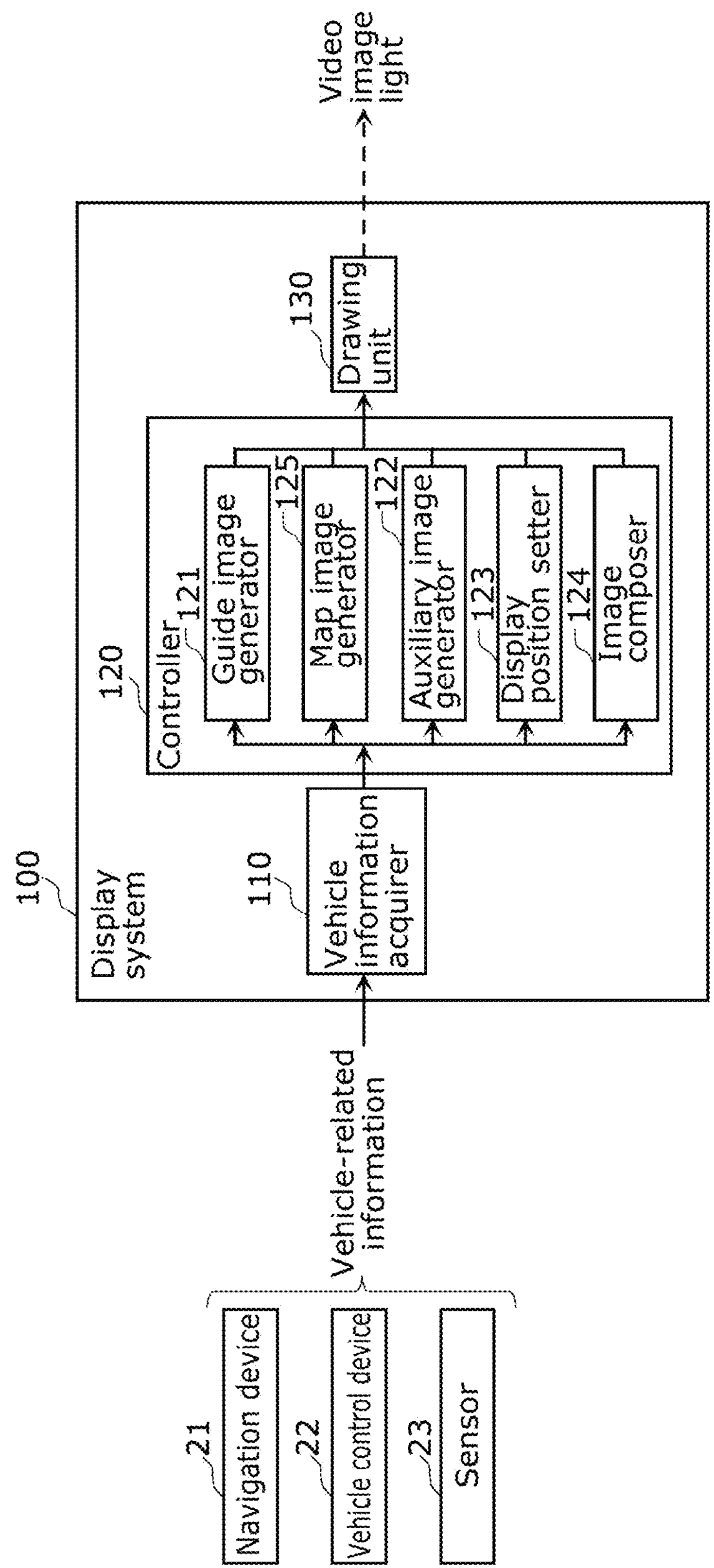
FIG. 3 is a block diagram illustrating a functional configuration of the display device according to the embodiment.

FIG. 3 is a block diagram showing a functional configuration of display system 100 according to the present embodiment.

Display system 100 includes vehicle information acquirer 110, controller 120, and drawing unit 130.

Vehicle information acquirer 110 serves as part of the function of an image generation apparatus and acquires vehicle-related information from each of navigation device 21, vehicle control device 22, and sensor 23, which are provided in vehicle 2.

Navigation device 21 is a device for navigating vehicle 2 to a destination by using a satellite positioning system such as a global positioning system (GPS). As the aforementioned vehicle-related information, navigation device 21 outputs vehicle position information, path information, and vehicle bearing information, the vehicle position information indicating the current location of vehicle 2, the path information indicating the path from the current location of vehicle 2 to the destination, and the vehicle bearing information indicating the travelling direction of vehicle 2.

Vehicle control device 22 may be configured as, for example, an electronic control unit (ECU) mounted on vehicle 2 and output vehicle speed information that indicates the travelling speed of vehicle 2 as the aforementioned vehicle-related information.

Sensor 23 detects objects such as people or other vehicles in the vicinity of vehicle 2 and outputs sensing information that indicates the result of detection as the aforementioned vehicle-related information. For example, sensor 23 may detect objects such as people or other vehicles by light detection and ranging (LiDAR).

Controller 120 serves as part of the function of the image generation apparatus and determines the form of display of display object 10 to generate a composite image in accordance with the vehicle-related information acquired by vehicle information acquirer 110. That is, the image generation apparatus is achieved by a combination of vehicle information acquirer 110 and controller 120. Specifically, controller 120 includes guide image generator 121, map image generator 125, auxiliary image generator 122, display position setter 123, and image composition unit 124. In addition, controller 120 further includes an inclination processor, a design processor, a shape processor, and a path-point determiner, which are not shown.

Guide image generator 121 is a processing unit that generates a guide image that indicates a path relative to the current location in accordance with the acquired vehicle position information and the acquired path information. Guide image generator 121 generates a guide image that mainly indicates information corresponding to navigation information.

Map image generator 125 is a processing unit that generates a map image of the vicinity of the current location in accordance with the acquired vehicle position information. Map image generator 125 also generates the guide image that mainly indicates information corresponding the to navigation information. The map image generated by map image generator 125 is a map image of the vicinity of the current location, and "the vicinity of the current location" includes a region ranging from the current location of vehicle 2 to the next point of a right or left turn. That is, the map image may be an image that reflects the next point of a right or left turn, or may be an image that reflects a region that is approximately within sight of the user and that is centered on the current location of vehicle 2. In the example of the image reflecting the next point of a right or left turn, when vehicle 2 has arrived at this point of the right or left turn, a map image corresponding to the second next point of a right or left turn is generated.

Auxiliary image generator 122 is a processing unit that generates an auxiliary image that associates the guide image with the map image. Although will be described later in detail, the auxiliary image generated includes two auxiliary images including a first auxiliary image and a second auxiliary image. The generated auxiliary images are overlaid on the map image so as to act to associate the map image and the guide image with each other.

Display position setter 123 sets the display position of the guide image so as to enable the user to visually recognize a virtual image of the guide image in a position that overlaps a path point on the path. Accordingly, for example in the case where the guide image indicates a right turn at the point of the right turn, the display position of the arrow head serving as the guide image is made correspond to the point of the right turn. However, there is a limit to the speed of reflexes of a human. Thus, the indication of the right turn using the guide image is started from a point located ahead of the point of the right- or left-turn to some extent. Beforehand, the display position is simply fixed at a distance of several ten to hundred meters ahead from the vehicle in order to indicate, for example, a straight-ahead direction at the same speed as the speed of vehicle 2.

Image composition unit 124 is a processing unit that generates a composite image for projecting the guide image and the map image in a mode in which the guide image and the map image are associated with each other. Specifically, image composition unit 124 performs processing for processing the guide image, the map image, and the auxiliary image into a composite image so as to associate the guide image and the map image with each other by the auxiliary image or by using the same form of display. Specific processing for generating a composite image, performed by image composition unit 124, will be described later in detail.

The path-point determiner determines a path point on the path indicated by the aforementioned path information and notifies display position setter 123 and the inclination processor of the determined path point.

Display position setter 123 uses the path point determined by the path-point determiner to determine the position of display object 10 that is visually recognized by user 1. This position is a position in a three-dimensional space and includes a lateral position in the breadth direction of vehicle 2, a depth position in the travelling direction of vehicle 2, and a height from the road surface.

The inclination processor determines the mode of inclination of display object 10 by using the path point determined by the path-point determiner. The mode of inclination (in other words, the attitude of the virtual image) is determined by yaw, roll, and pitch angles of display object 10.

The design processor determines the design of display object 10. Note that the design of display object 10 according to the present embodiment refers to coloration or brightness of display object 10 and includes a dynamic change in coloration or brightness.

The shape processor determines the shape of display object 10. Note that the shape of display object 10 according to the present embodiment is defined by the overall length or width of display object 10. The overall length refers to the length of display object 10 in the pointed direction indicated by display object 10, and the width refers to the length of display object 10 in a direction perpendicular to the pointed direction. The shape processor determines the shape of display object 10 by changing the ratio of the overall length and the width.

Controller 120 outputs display-form information to drawing unit 130, the display-form information indicating the form of display including position, mode of inclination, design, and shape, which are described above.

Drawing unit 130 is one example of a display and a projector. Thus, drawing unit 130 has both a function of displaying the composite image and a function of projecting light representing the composite image displayed on the display onto a display medium. For this purpose, drawing unit 130 acquires the display-form information from controller 120 and draws display object 10 in accordance with the display-form information. For example, drawing unit 130 may include a light source and an optical system and generate video image light representing display object 10 in the form of display indicated by the display-form information so as to enable user 1 to visually recognize display object 10. Then, drawing unit 130 projects the video image light onto windshield 2*a*. As a result, display object 10 with the determined mode of inclination, the determined design, and the determine shape is visually recognized by user 1 in the determined position. That is, as to the mode of inclination, drawing unit 130 projects the video image light representing display object 10 displayed in the mode of inclination determined by the inclination processor of controller 120 onto windshield 2*a* of vehicle 2 so as to cause the video image light to be reflected off windshield 2*a* toward user 1 of vehicle 2 and to allow user 1 to visually recognize display object 10 in the mode of inclination as a virtual image through windshield 2*a*.

Figure 4:
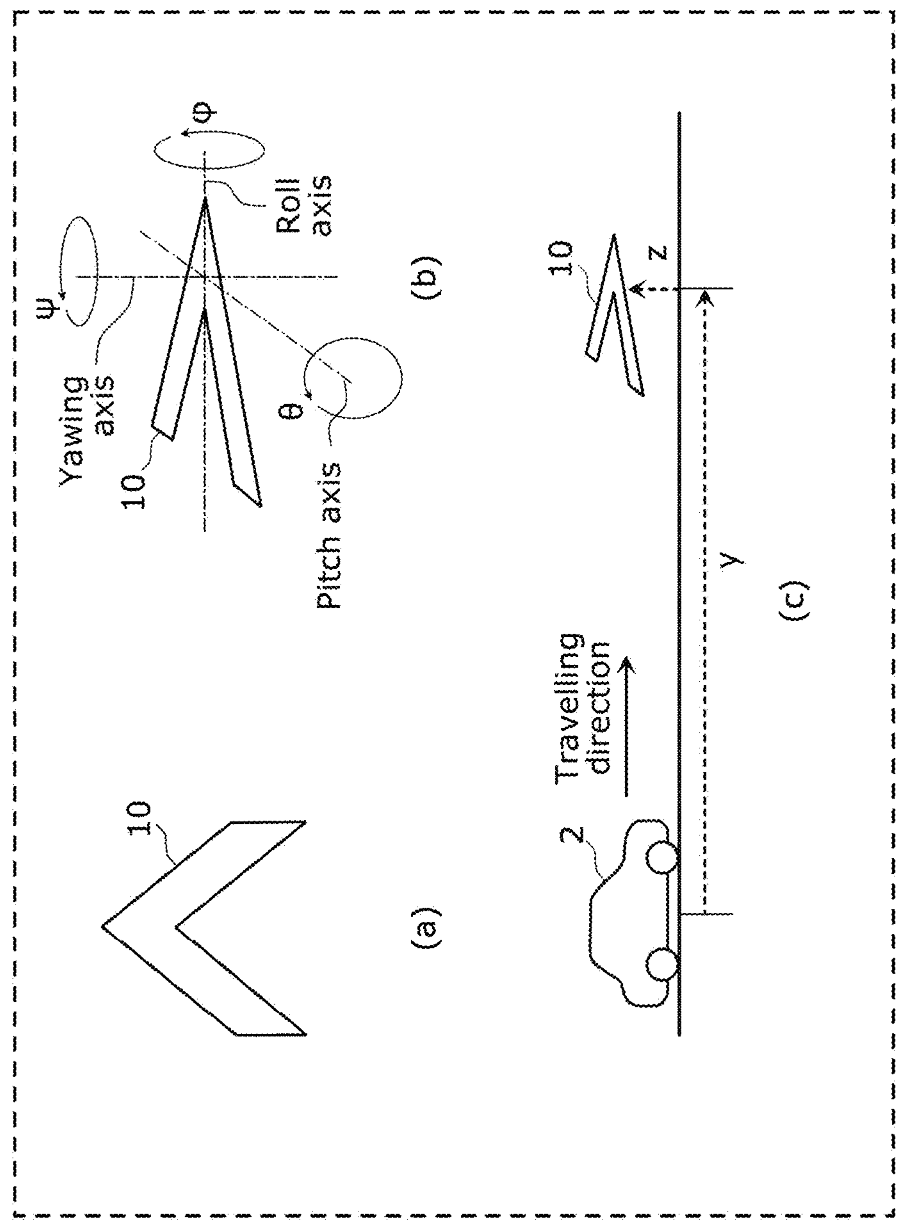
FIG. 4 is a diagram showing one example of a display object according to the embodiment.

FIG. 4 shows one example of display object 10 according to the present embodiment. Note that (a) in FIG. 4 shows a top view of the guide image serving as one display object 10, (b) in FIG. 4 shows a perspective view of the guide image serving as one display object 10, and (c) in FIG. 4 shows the position on the guide image serving as the one display object 10 in the travelling direction and height direction of vehicle 2.

As shown in (a) and (b) in FIG. 4, display object 10 is formed in a flat plate-like and approximately V- or inverted V-shape. The inclination processor of controller 120 determines the mode of inclination of display object 10 by controlling yaw angle Ψ, roll angle φ, and pitch angle θ of display object 10. Although the description in FIG. 4 focuses on the guide image serving as one type of display object 10, similar processing for controlling the attitude of the virtual image is also performed on the map image serving as another type of display object 10 and on the auxiliary image overlaid on the map image.

Yaw angle Ψ is the angle of rotation of display object 10 about a yaw axis as a central axis extending in the thickness direction of display object 10. For example, in the case where the pointed direction of display object 10 is in the travelling direction of vehicle 2, yaw angle Ψ of display object 10 is 0°.

Roll angle φ is an angle of rotation of display object 10 about a roll axis as a central axis extending in the pointed direction of display object 10. For example, in the case where display object 10 is arranged in a horizontal plane, roll angle φ of display object 10 is 0°.

Pitch angle θ is an angle of rotation of display object 10 about a pitch axis as a central axis extending in the direction perpendicular to the yaw and roll axes. For example, in the case where display object 10 is arranged in a horizontal plane, pitch angle θ of display object 10 is 0°.

As shown in (c) in FIG. 4, display position setter 123 of controller 120 determines position y of display object 10 in the travelling direction of vehicle 2 in accordance with, for example, the vehicle speed information. Position y is indicated as the distance from vehicle 2 in the travelling direction. Moreover, display position setter 123 determines position z as the height of display object 10. Position z is indicated as the height from the road surface on which vehicle 2 is travelling.

[Example of Display of Display Object]

Figure 5A:
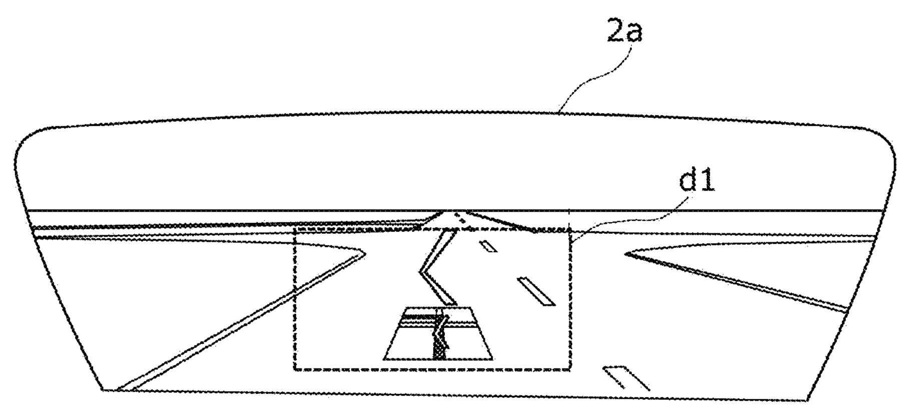
FIG. 5A is a diagram showing a specific example of display objects overlaid on a road surface by the display device according to the embodiment.
Figure 5B:
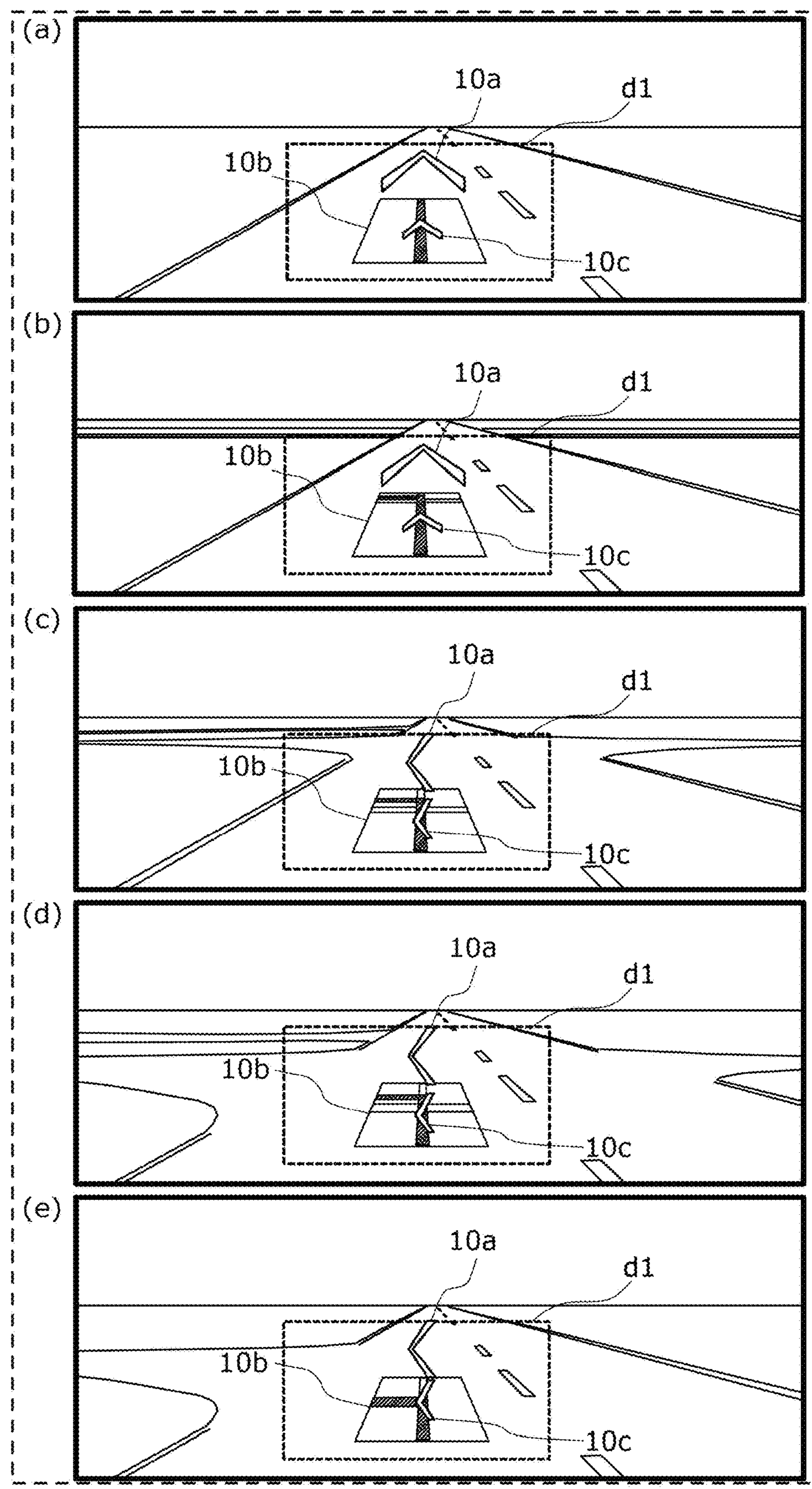
FIG. 5B is a diagram showing another specific example of display objects overlaid on a road surface by the display device according to the embodiment.

Hereinafter, the generation of the composite image by image composition unit 124 will be described in detail by using some examples. FIGS. 5A and 5B are diagrams showing specific examples of display objects overlaid on a road surface by the display system according to the embodiment. FIG. 5A shows a landscape including display objects 10 and so on when windshield 2*a* is viewed as a whole. In this example, so-called head-up display is provided in which the upward direction of display objects 10 corresponds to the travelling direction of vehicle 2. Meanwhile, since, in the present embodiment, it is enough to show only display range d1 in which the composite image is displayed, only part of the windshield that includes display range d1 is shown in the following description (including FIGS. 6 to 9 in addition to FIG. 5B).

In FIG. 5B, (a) shows surrounding circumstances within display range d1 at a first point in time, (b) shows surrounding circumstances within display range d1 at a second point in time that is later than the first point in time, (c) shows surrounding circumstances within display range d1 at a third point in time that is later than the second point in time, (d) shows surrounding circumstances within display range d1 at a fourth point in time that is later than the third point in time, and (e) shows surrounding circumstances within display range d1 at a fifth point in time that is later than the fourth point in time. This drawing configuration also applies to FIGS. 6 to 9 described later.

In the example shown in FIG. 5B, guide image 10*a*, map image 10*b*, and first auxiliary image 10*c* are displayed as display objects 10. First auxiliary image 10*c* is overlaid on a position on map image 10*b* that corresponds to a path point at which the virtual image of guide image 10*a* is displayed. Accordingly, guide image 10*a* and map image 10*b* are associated with each other from the viewpoint about what position on the map image corresponds to the position on the virtual image of guide image 10*a*. Besides, since guide image 10*a* corresponds in shape to first auxiliary image 10*c* (e.g., similitude relations or projective relations), it can be seen at a glance that first auxiliary image 10*c* corresponds to guide image 10*a*. Moreover, first auxiliary image 10*c* is configured so as to have an attitude corresponding to the direction pointed by guide image 10*a* (the attitude is changed).

Figure 6:
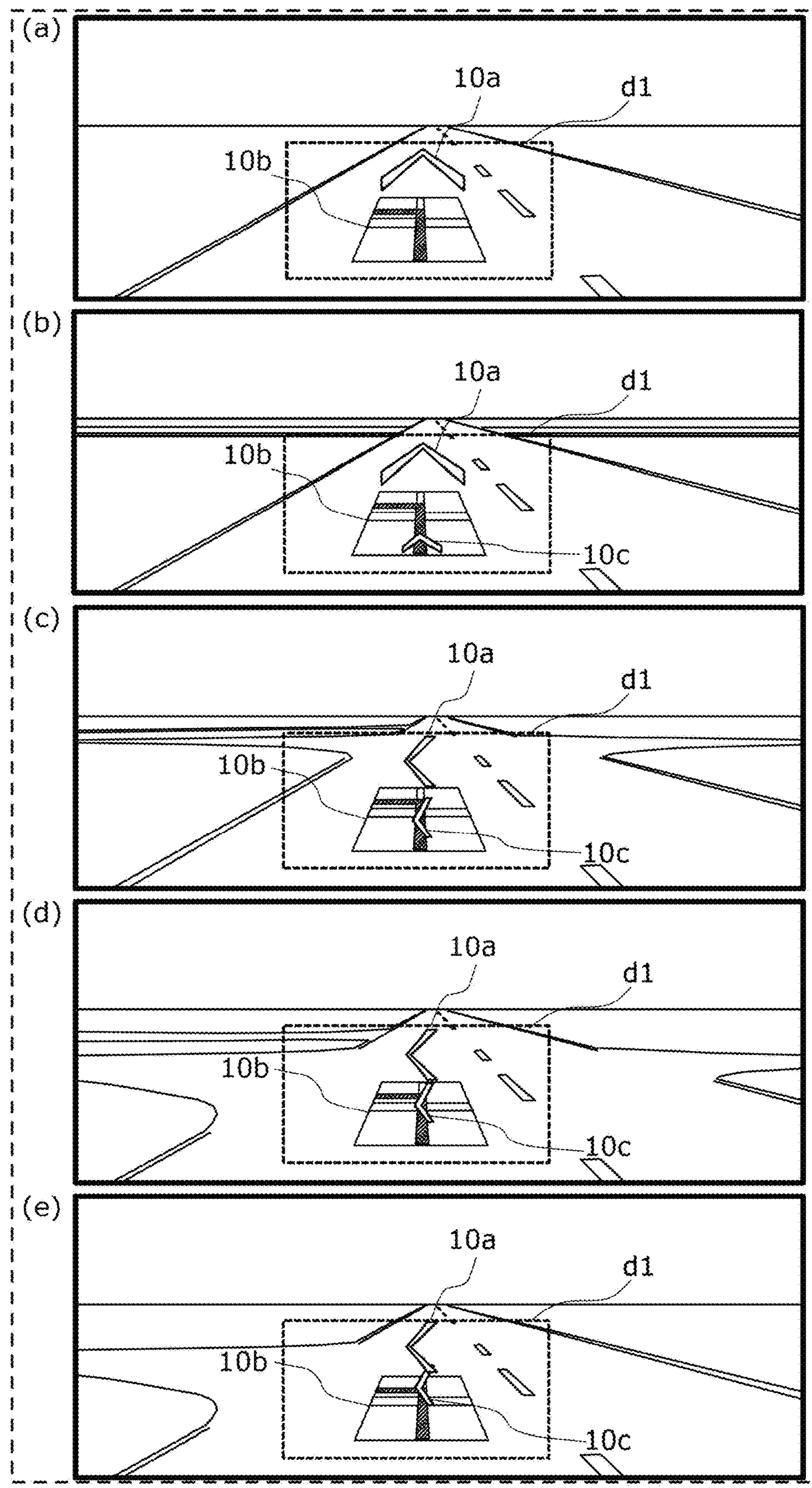
FIG. 6 is a diagram showing another specific example of display objects overlaid on a road surface by the display device according to the embodiment.

The example shown in FIG. 6 differs from the example shown in FIG. 5B in the configuration of map image 10*b*. Specifically, in the configuration in FIG. 5B, map image 10*b* is displayed centered on the current location of vehicle 2 (strictly speaking, the current location of vehicle 2 corresponds to the vicinity of the center). In contrast, in the example shown in FIG. 6, map image 10*b* is fixed within a predetermined range centered on the next point of a right or left turn. Thus, at the first point in time, first auxiliary image 10*c* displayed in the vicinity of vehicle 2 and indicating the position on guide image 10*a* does not appear in map image 10*b*. After the second point in time, first auxiliary image 10*c* has reached inside the predetermined range from the point of a right or left turn.

Figure 7:
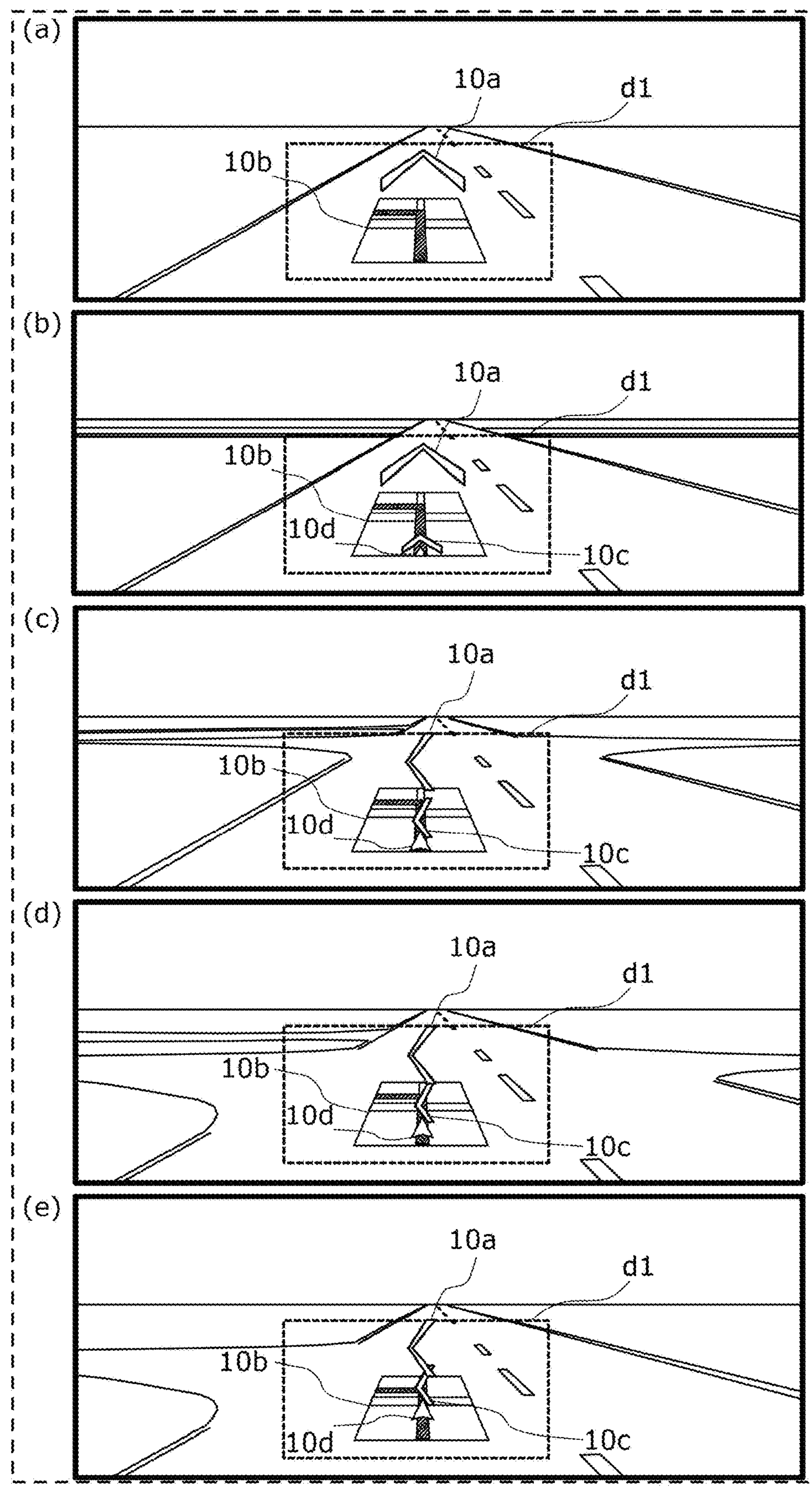
FIG. 7 is a diagram showing another specific example of display objects overlaid on a road surface by the display device according to the embodiment.

The example shown in FIG. 7 differs from the example shown in FIG. 5B in the display of second auxiliary image 10*d*. Since second auxiliary image 10*d* is overlaid on the position on the map image that corresponds to the current location, first auxiliary image 10*c* and second auxiliary image 10*d* allow the position of vehicle 2 and the position on the virtual image of guide image 10*a* ahead of vehicle 2 to be seen at a glance.

Figure 8:
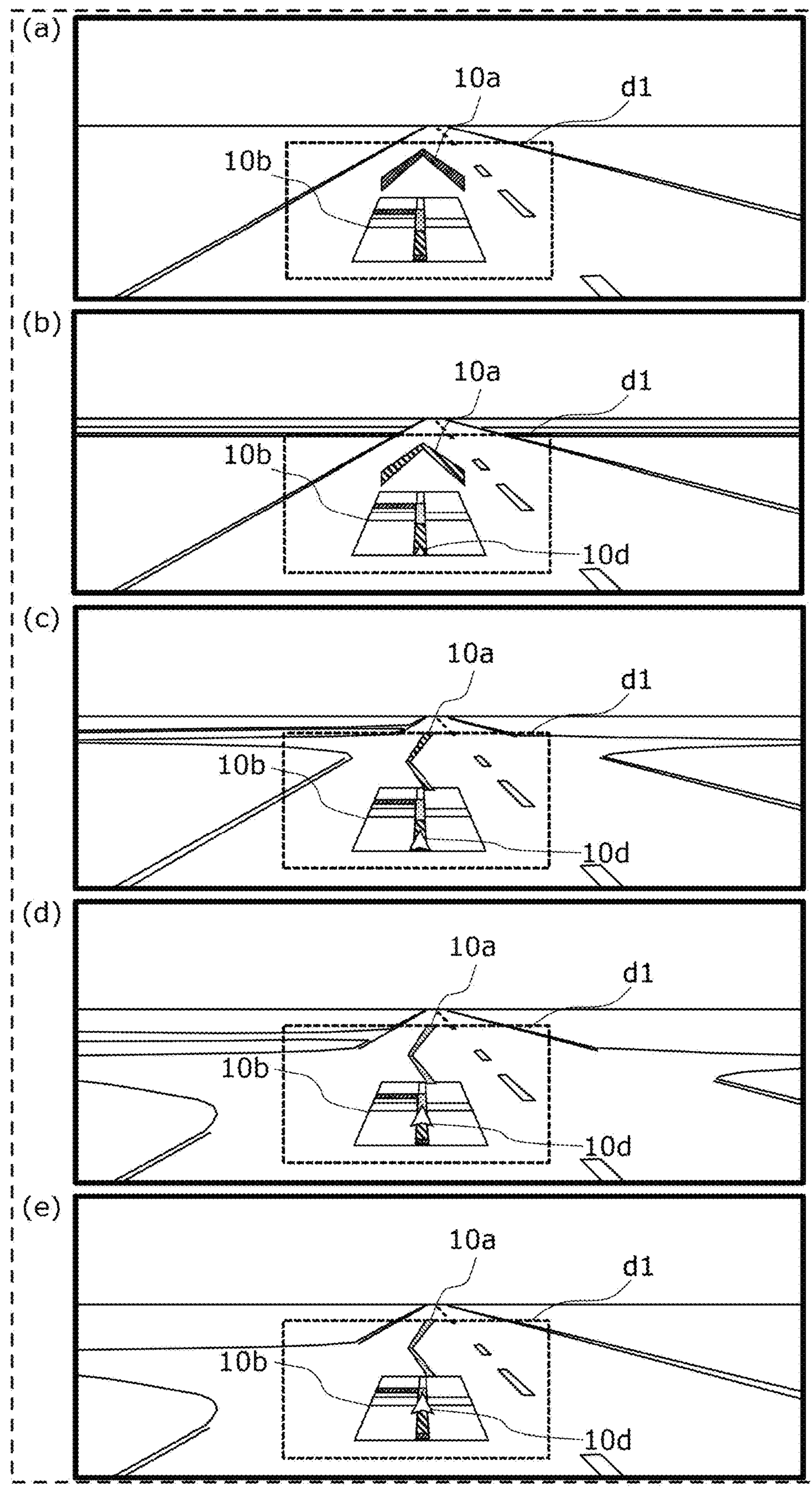
FIG. 8 is a diagram showing another specific example of display objects overlaid on a road surface by the display device according to the embodiment.

In the example shown in FIG. 8, guide image 10*a*, map image 10*b*, and second auxiliary image 10*d* are displayed as display objects 10. Then, portions of map image 10*b* that correspond to paths are colored (in the drawing, coloring is represented by hatching or dot hatching). Then, the mode of display of guide image 10*a* changes according to the current location of vehicle 2 in second auxiliary image 10*d*. For example, at the first point in time, the color of guide image 10*a* corresponds to hatching of oblique lines from the upper right to the lower left in the drawing (although second auxiliary image 10*d* is not displayed in the drawing). Subsequently, at the second point in time, guide image 10*a* is displayed in, for example, the same color as the color of map image 10*b* corresponding to the current location of vehicle 2 (e.g., color that corresponds to hatching of oblique lines from the upper left to the lower right in the drawing). The same applies to coloring at the third point in time. Subsequently, at the fourth point in time, guide image 10*a* is displayed in the same color as the different color of map image 10*b* corresponding to the current location of vehicle 2 (color that corresponds to dot hatching in the drawing). The same applies to coloring at the fifth point in time. Since the color of map image 10*b* changes according to the distance to the point of a right or left turn, the above-described configuration enables the user to presurmise the distance to the point of a right or left turn by simply viewing guide image 10*a*.

Figure 9:
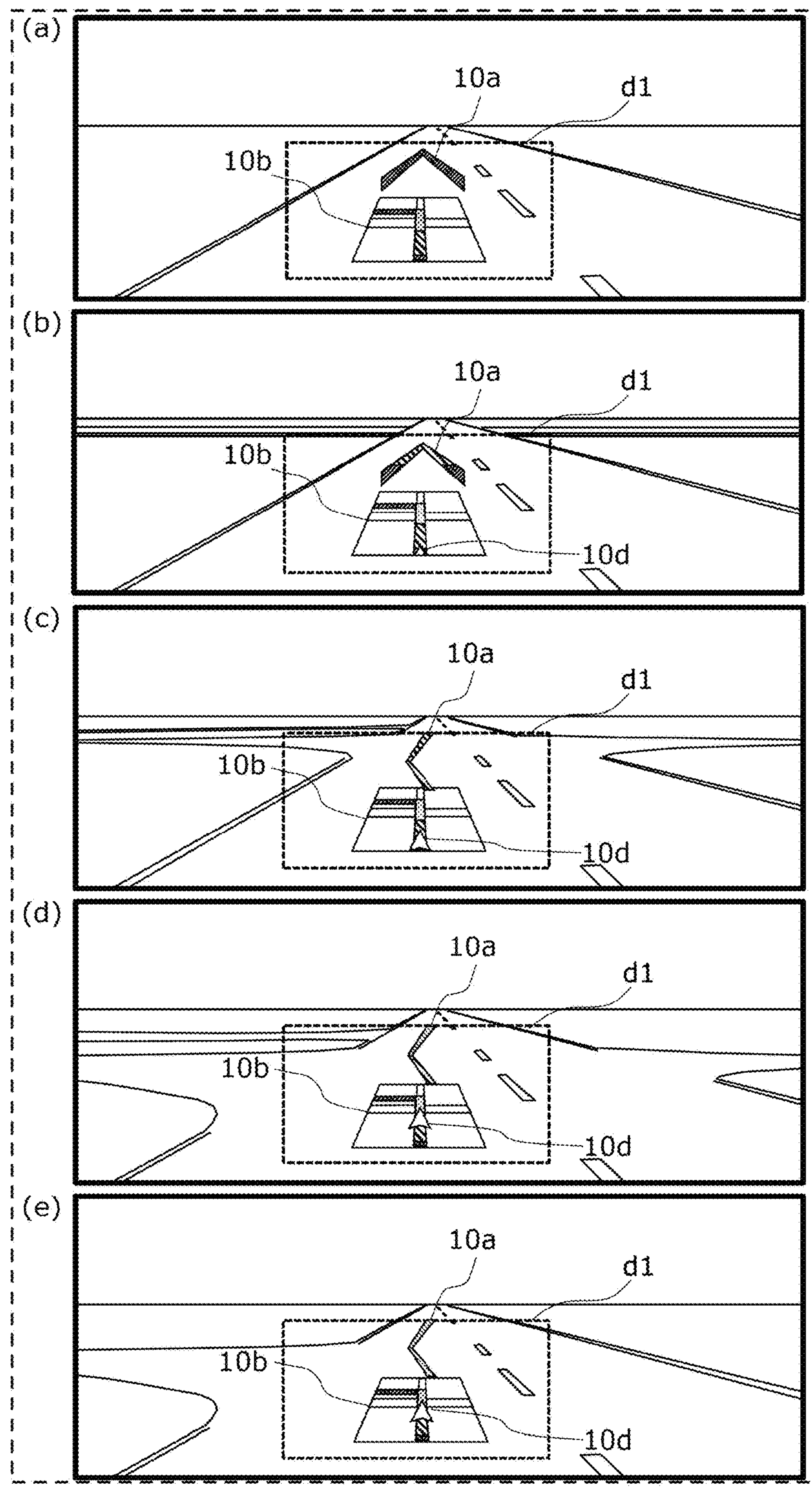
FIG. 9 is a diagram showing another specific example of display objects overlaid on a road surface by the display device according to the embodiment.

Similarly in the example shown in FIG. 9, the color of guide image 10*a* changes with the color of map image 10*b*. In the example shown in FIG. 8, the color of the whole region of guide image 10*a* from top to bottom changes uniformly, but in the example shown in FIG. 9, the color of guide image 10*a* is displayed regionally in correspondence with the distance from the current location of vehicle 2 to the point of a right or left turn such that the color of guide image 10*a* becomes closer to the color of the point of a right or left turn toward above and becomes closer to the color of the current location of vehicle 2 toward below.

[Flowchart for Processing Operations]

Figure 10:
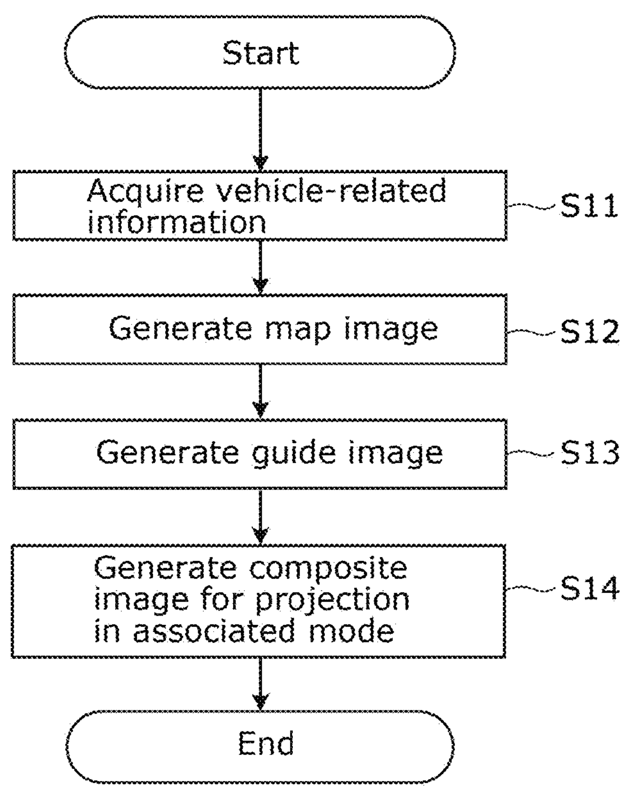
FIG. 10 is a flowchart showing processing operations of an image generation apparatus according to the embodiment.

FIG. 10 is a flowchart showing processing operations performed by the image generation apparatus according to the embodiment. As shown in FIG. 10, in the present embodiment, firstly, vehicle information acquirer 110 acquires the vehicle-related information on vehicle 2 (S11). The vehicle-related information includes the vehicle position information indicating the current location of vehicle 2, and the path information indicating the path along which vehicle 2 is guided to the destination. Thus, it can be said that vehicle information acquirer 110 acquires the vehicle position information and the path information in step S11.

Then, map image generator 125 generates a map image of the vicinity of the current location in accordance with the acquired vehicle position information (S12). Meanwhile, guide image generator 121 generates a guide image that indicates a path relative to the current location in accordance with the acquired vehicle position information and the acquired path information (S13).

Thereafter, image composition unit 124 generates a composite image for projecting the guide image and the map image, which have been generated, in a mode in which the guide image and the map image are associated with each other (S14).

When the composite image generated as described above is projected, the user is able to visually recognize the guide image and the map image in association with each other. Accordingly, the user is able to obtain enough information from the display and to easily understand the relationship of those pieces of information. This alleviates user discomfort on the display objects.

Other Embodiments

While the display device according to one or more aspects of the present disclosure has been described with reference to the embodiment, the present disclosure is not intended to be limited to this embodiment. The present disclosure may also include other variations obtained by making various modifications conceivable by those skilled in the art to the embodiment, without departing from the scope of the present disclosure.

In the above-described embodiment, each constituent element may be configured as dedicated hardware, or may be realized by executing a software program suitable for each constituent element. Each constituent element may also be realized by a program execution unit such as a central processing unit (CPU) or a processor reading out and executing a software program recorded on a recording medium such as a hard disk or semiconductor memory. Here, the software program for realizing display system 100 or the like according to the above-described embodiment may cause a computer to execute each step included in, for example, the flowchart shown in FIG. 10.

In the above-described embodiment, an image having an arrow-head shape is displayed as a display object, but the shapes of display objects are not limited to the arrow-head shape and may be any other shape such as a triangle or an arrow shape as long as they points the direction of guidance along the path. The display objects may be displayed in long carpet-like shapes and overlaid on the road surface. Although the display objects are displayed in order to guide the vehicle to the destination, they may be displayed for any other purpose or application as long as they are displayed based on the orientation of the vehicle. For example, the display objects may be images that indicate the orientation of the vehicle itself, or may be images that point a planed travelling direction of the vehicle that is estimated from the orientation of the vehicle and the rotation angle of a steering engine.

The above-described embodiment describes the configuration including the navigation device, the vehicle control device, the sensor, and the display system that are provided separately as different devices, but the present disclosure is not limited to this configuration. For example, the display system may be integrated with at least one of the other devices into a single device, as in the example in which the navigation device and the display system are integrated together into a single device. The scope of the present disclosure also includes a configuration realized by including one or more groups of devices obtained by any arbitrary combination of the navigation device, the vehicle control device, the sensor, and the display system described above.

Note that the present disclosure also includes the following cases.

(1) At least one of the devices described above is specifically a computer system configured by, for example, a microprocessor, read only memory (ROM), random access memory (RAM), a hard disk unit, a display unit, a keyboard, and a mouse. The RAM or the hard disk unit stores computer programs. At least one of the devices described above achieves its functions as a result of the microprocessor operating in accordance with the computer programs. The computer programs as used herein are configured by combining a plurality of instruction codes that indicate commands given to the computer in order to achieve predetermined functions.

(2) Some or all of the constituent elements that configure at least one of the devices described above may be configured as one system LSI (large scale integration) circuit. The system LSI circuit is a super-multi-function LSI circuit manufactured by integrating a plurality of structural units on a single chip, and is specifically a computer system configured to include, for example, a microprocessor, ROM, and RAM. The RAM stores computer programs. The system LSI circuit achieves its functions when the microprocessor operates in accordance with the computer programs.

(3) Some or all of the constituent elements that configure at least one of the devices described above may be configured as an IC card detachable from the device or as a stand-alone module. The IC card or the module is a computer system configured by, for example, a microprocessor, ROM, and RAM. The IC card or the module may include the aforementioned super-multi-function LSI circuit. The IC card or the module achieves its functions when the microprocessor operates in accordance with the computer programs. Besides, the IC card or the module may be tamper-resistant.

(4) The present disclosure may be realized as the method described above. The present disclosure may also be realized as a computer program for causing a computer to execute the method, or as digital signals consisting of computer programs.

The present disclosure may also be realized as a computer-readable recording medium having recorded thereon computer programs or digital signals, examples of which include a flexible disc, a hard disk, a Compact Disc (CD)-ROM, a DVD, a DVD-ROM, a DVD-RAM, a Blu-ray (registered trademark) Disc (BD), and semiconductor memory. As another alternative, the present disclosure may also be realized as digital signals recorded on such a recording medium.

The present disclosure may also be realized by transmitting computer programs or digital signals via, for example, telecommunication lines, wireless or wired communication lines, networks represented by the Internet, or data broadcasting.

The present disclosure may also be realized by another independent computer system by transmitting programs or digital signals recorded on a recording medium or by transmitting programs or digital signals via, for example, a network.

While various embodiment has been described herein above, it is to be appreciated that various changes in form and detail may be made without departing from the spirit and scope of the present disclosure as presently or hereafter claimed.

Further Information about Technical Background to this Application

The disclosures of the following patent applications including specification, drawings, and claims are incorporated herein by reference in their entirety: Japanese Patent Application No. 2022-058288 filed on Mar. 31, 2022, and PCT International Application No. PCT/JP2023/005001 filed on Feb. 14, 2023.

Industrial Applicability

The display device according to the present disclosure achieves the effect of being able to alleviate user discomfort on display objects and may be applicable to, for example, a vehicle-mounted head-up display.

The invention claimed is:

1. An image generation apparatus for use in a display system that projects an image onto a display medium of a vehicle to enable a user to visually recognize a virtual image of the image, the image generation apparatus comprising:

a vehicle information acquisition that acquires vehicle position information and path information, the vehicle position information indicating a current location of the vehicle, the path information indicating a path along which the vehicle is guided to a destination;

a map image generation that generates a map image of a vicinity of the current location in accordance with the vehicle position information acquired;

a guide image generation that generates a guide image that indicates the path relative to the current location in accordance with the vehicle position information acquired and the path information acquired;

an image composition that generates a composite image for projecting the guide image and the map image which have been generated, in a mode in which the guide image and the map image are associated with each other; and a display position setting that sets a display position of the guide image to enable the user to visually recognize a virtual image of the guide image in a position that overlaps a path point on the path, wherein the auxiliary image is overlaid on the position on the map image that corresponds to the path point at which the virtual image of the guide image is displayed.

2. The image generation apparatus according to claim 1, wherein the map image generation generates the map image that is visually recognized by the user along a road surface ahead of the vehicle.

3. The image generation apparatus according to claim 1, further comprising:

an auxiliary image generation that generates an auxiliary image that associates the guide image with the map image, wherein, in the composite image, the guide image and the map image are associated with each other by the auxiliary image overlaid on the map image.

4. The image generation apparatus according to claim 3, wherein the auxiliary image generation generates the auxiliary image that is visually recognized by the user in a shape corresponding to a shape of the guide image.

5. The image generation apparatus according to claim 4, wherein the auxiliary image is overlaid on a position on the map image that corresponds to the current location.

6. The image generation apparatus according to claim 3, further comprising:

a display position setting that sets a display position of the guide image to enable the user to visually recognize a virtual image of the guide image in a position that overlaps a path point on the path, wherein the auxiliary image generation generates a first auxiliary image and a second auxiliary image as two auxiliary images each being the auxiliary image, wherein the first auxiliary image is overlaid on a position on the map image that corresponds to the path point at which the virtual image of the guide image is displayed, and wherein the second auxiliary image is overlaid on a position on the map image that corresponds to the current location.

7. The image generation apparatus according to claim 6, wherein the auxiliary image generation generates the first auxiliary image that is visually recognized by the user in a shape corresponding to a shape of the guide image.

8. The image generation apparatus according to claim 1, wherein the guide image generation determines at least one of an attitude or a shape of a virtual image of the guide image that is visually recognized by the user, in accordance with the path information, and wherein the guide image generation generates the guide image that is visually recognized by the user in at least one of the attitude or the shape determined.

9. The image generation apparatus according to claim 1, wherein the map image generation generates the map image to make an upward direction in the map image correspond to a travelling direction of the vehicle.

10. The image generation apparatus according to claim 1, wherein the map image generation generates the map image to make a central portion of the map image correspond to the current location.

11. The image generation apparatus according to claim 1, wherein the map image generation generates the map image to make a central portion of the map image correspond to a first position on the path, and when the vehicle has passed through the first position, the map image generation generates the map image to make the central portion correspond to a second position on the path, the second position being closer to the destination than the first position is.

12. The image generation apparatus according to claim 1, wherein the guide image generation changes a mode of the guide image that is visually recognized by the user, according to a distance from the current location of the vehicle to a point of a right or left turn on the path; and wherein the map image generation generates the map image that is visually recognized by the user, in a mode associated with a change in the mode of the guide image.

13. The image generation apparatus according to claim 12, wherein the guide image generation changes a color of the guide image that is visually recognized by the user, according to a distance from the current location of the vehicle to a point of a right or left turn on the path.

14. The image generation apparatus according to claim 13, wherein the map image generation changes coloring of a section of the map image according to a distance to the point of the right or left turn on the path, the section ranging from the current location of the vehicle to the point of the right or left turn; and wherein the guide image generation changes the color of the guide image to a color that corresponds to coloring in a position on the map image that corresponds to the current location of the vehicle.

15. A display system comprising:

the image generation apparatus according to claim 1;

a display that displays the composite image; and a projector that projects light onto the display medium, the light representing the composite image displayed on the display.

16. An image generation method to be executed by a computer for projecting an image onto a display medium of a vehicle to enable a user to visually recognize a virtual image of the image, the image generation method comprising:

acquiring vehicle position information and path information, the vehicle position information indicating a current location of the vehicle, the path information indicating a path along which the vehicle is guided to a destination;

generating a map image of a vicinity of the current location in accordance with the vehicle position information acquired;

generating a guide image that indicates the path relative to the current location, in accordance with the vehicle position information acquired and the path information acquired;

generating a composite image for projecting the guide image and the map image which have been generated, in a mode in which the guide image and the map image are associated with each other; and setting a display position of the guide image to enable the user to visually recognize a virtual image of the guide image in a position that overlaps a path point on the path, wherein the auxiliary image is overlaid on the position on the map image that corresponds to the path point at which the virtual image of the guide image is displayed.

17. A non-transitory computer-readable recording medium having recorded thereon a program for causing a computer to execute the image generation method according to claim 16.

* * * * *